(No Model.)

J. ROBINSON.
VALVE.

No. 553,939. Patented Feb. 4, 1896.

WITNESSES
Jos Gregory
F. L. Durand

INVENTOR
James Robinson,
per W. H. Singleton,
Attorney

UNITED STATES PATENT OFFICE.

JAMES ROBINSON, OF HUNSLET, ENGLAND.

VALVE.

SPECIFICATION forming part of Letters Patent No. 553,939, dated February 4, 1896.

Application filed March 12, 1894. Serial No. 503,270. (No model.)

*To all whom it may concern:*

Be it known that I, JAMES ROBINSON, a subject of the Queen of Great Britain, residing at Hunslet, Leeds, England, have invented certain new and useful Improvements in Valves; and I do hereby declare the following to be a full, clear, and exact description of the invention, such as will enable others skilled in the art to which it appertains to make and use the same.

This invention relates to a new or improved stop-valve for steam, water, compressed air, gas or other fluid. This form of valve is devised with the purpose of keeping the working or moving faces and seatings of the said valve in close contact when closed, thereby preventing leakage, and also to prevent the evil effects of contraction and expansion, common in ordinary metallic stop-valves, by constructing the valve in such a manner as will allow of a springing action taking place between the working faces and the seatings each time the valve is operated or its temperature varied.

I propose to construct the valve with an annular groove or recess under its under edge or rim, which groove will form two beveled faces, which faces will, when the valve is closed, come in contact with two faces of corresponding angles formed on a V-shaped annular ridge and cast with or attached to the valve-body, and surrounding the way or opening in said valve-body between the two beveled faces formed in the valve. I propose to make narrow annular grooves extending vertically into the valve and also into the V-shaped annular ridge of the valve-body. The object of these grooves is to allow the beveled faces formed in the valve to spring apart and those in the annular ridge to spring together, thereby causing the two parts to be closely gripped together and insuring a close contact being maintained between the parts each time the valve is closed or its temperature altered after the valve is closed. The gripping or springing action of the valve will allow the faces or parts in contact of both the valve and body being burnished and cleaned each time the valve is rotated on its seating.

Figure 1:
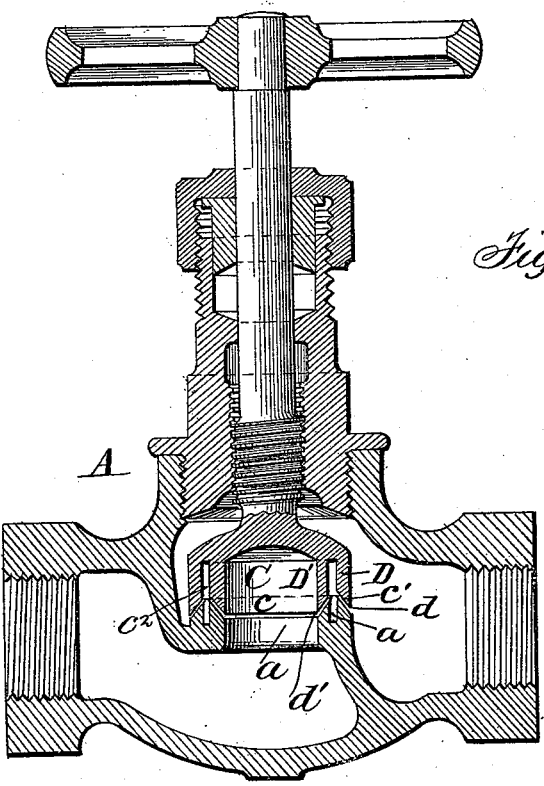
Figure 2:
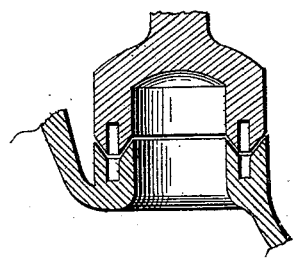

In the annexed drawings, Figure 1 is a vertical section taken through the valve provided with the invention. Fig. 2 represents a view of a modification of the meeting parts of the valve in which they are arranged reversely to the way shown in Fig. 1.

In the drawings, the letter A represents any ordinary construction of the valve, except in so far as it has the invention to be described. The valve-seat $a$ of this valve is made conical in cross-section, or in the shape of an annular ridge. In the edge of this valve-seat $a$ is made the annular groove $a'$, extending vertically therein. The meeting edge $c$ of the valve C has the conical depression $c'$, adapted to fit over the conical valve-seat $a$. Extending vertically up into the valve C and communicating with the depression $c'$ is the annular groove $c^2$. This groove $c^2$ and the depression $c'$ thus divide the valve C into two concentric annuli D and D'. These annuli D and D' have the lips $d$ and $d'$.

When the valve C is turned down, the depression $c'$ comes over the valve-seat $a$, so that the lips $d$ and $d'$ come upon opposite sides of the valve-seat $a$.

It will be seen that as the valve C is turned down upon its seat $a$ the shape of this seat and of the depression $c'$ tends to spread the lips $d$ and $d'$ apart, the groove $c^2$ permitting such spreading. At the same time the lips of the valve-seat $a$ are pressed toward each other. This, of course, develops the elasticity inherent in the metal of which the parts are composed. The resilient reaction of the valve and its seat causes the parts to be forced tightly together. At the same time, as will be perceived, it only requires a very slight force to turn the valve C so as to withdraw it from the seat $a$. The shape of the joint between these parts is of such a nature that they are forced together so as to develop the elasticity therein and yet at the same time permit of their being readily separated.

In Fig. 2 the parts are shown reverse to the way in which they are shown in Fig. 1. In this figure the valve is shown with the conical annular ridge and the valve-seat with the conical depression, both having the annular groove extending vertically in them the same as in the form shown in Fig. 1.

I am made aware of United States Patent No. 246,132 for improvement in a valve. In this patent there is shown a valve the valve-seat of which is inverted-V shape in cross-section, and the valve is provided with an annular groove to fit over this seat, there also being a guard-flange at the center of the valve. While it is true that the specification of the patent said that by having a groove "the valve is adapted to wedge down tightly upon the seat," still there is no hint in the specification that there is any elastic action in the valve.

In the present invention such depth is given to the groove between the annuli of the valve and the valve-seat that the springiness or elasticity is developed in such annuli when the valve is closed. This is the salient feature of the present invention, and in so far as I am aware it is new.

Having described my invention, what I claim is—

The combination of a valve and its seat, one being conical and the other having a conical depression and both having an annular groove extending vertically into them, as set forth.

In testimony whereof I affix my signature in presence of two witnesses.

JAMES ROBINSON.

Witnesses:
  DAVID DUNCAN,
  WM. B. HALL.